US007477884B2

(12) United States Patent
Choi et al.

(10) Patent No.: US 7,477,884 B2
(45) Date of Patent: Jan. 13, 2009

(54) TRI-STATE RF SWITCH

(75) Inventors: Hyung Choi, Seongnam-si (KR); Jiwel Jiao, Shanghai (CN); Yuelin Wang, Shanghai (CN); Xianglong Xing, Shanghai (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 529 days.

(21) Appl. No.: 11/345,237

(22) Filed: Feb. 2, 2006

(65) Prior Publication Data

US 2006/0229045 A1 Oct. 12, 2006

(30) Foreign Application Priority Data

Apr. 8, 2005 (KR) ..................... 10-2005-0029575

(51) Int. Cl.
*H04B 1/06* (2006.01)

(52) U.S. Cl. .................... 455/252.1; 455/333; 200/181; 257/424; 333/105; 335/78

(58) Field of Classification Search ................. 200/181, 200/237; 257/415–420, 424, 427; 333/101, 333/105, 262; 335/78; 455/316, 323, 333, 455/252.1

See application file for complete search history.

(56) References Cited

U.S. PATENT DOCUMENTS

| | | | | |
|---|---|---|---|---|
| 5,867,302 | A | 2/1999 | Fleming | |
| 6,100,477 | A | 8/2000 | Randall et al. | |
| 6,608,268 | B1 * | 8/2003 | Goldsmith | 200/181 |
| 6,615,028 | B1 * | 9/2003 | Loke et al. | 455/127.1 |
| 6,748,203 | B1 * | 6/2004 | Brankovic et al. | 455/259 |
| 6,791,441 | B2 | 9/2004 | Pillans et al. | |
| 6,949,985 | B2 * | 9/2005 | Qiu et al. | 333/105 |
| 7,242,273 | B2 * | 7/2007 | Isobe et al. | 335/78 |
| 7,265,429 | B2 * | 9/2007 | Wan | 257/415 |
| 2004/0085166 | A1 * | 5/2004 | Kang et al. | 333/262 |

* cited by examiner

*Primary Examiner*—Nhan T Le
(74) *Attorney, Agent, or Firm*—Sughrue Mion, PLLC

(57) ABSTRACT

A tri-state RF MEMS switch includes: a first well formed in a first substrate; a first input signal line and a first output signal line forming a first gap therebetween in the first well; a post bar forming a boundary between the second well and third well in the second substrate; a second input signal line and a second output signal line, and a third input signal line and a third output signal line forming a second gap and a third gap in the second well and the third well, respectively; and a membrane disposed between the first substrate and the second substrate such that the membrane crosses the first, second and third gaps, the membrane including a first conductive pad, a second conductive pad, and a third conductive pad thereon to face the first, second and third gaps, respectively.

14 Claims, 7 Drawing Sheets

TRI-STATE RF SWITCH

CROSS-REFERENCE TO RELATED PATENT APPLICATIONS

This application claims the benefit of Korean Patent Application No. 10-2005-0029575, filed on Apr. 8, 2005, in the Korean Intellectual Property Office, the disclosure of which incorporated herein in its entirety by reference.

BACKGROUND OF THE INVENTION

1. Field of the Invention

The present invention relates to a tri-state latching radio frequency (RF) switch and, more particularly, to an RF micro electromechanical system (MEMS) switch that is latched in one of three states (tri-states).

2. Description of the Related Art

Radio frequency (RF) micro electromechanical system (MEMS) devices can be used in communications, radar, and WLAN technology. RF MEMS devices include micromachined capacitors, inductors, RF switches, phase shifters, tunable oscillators, etc. These devices have better characteristics than the devices manufactured by the prior art. For example, in comparison to a conventional FET or GaAs PIN diode swithches, RF MEMS switches have characteristics such as low insertion loss, good signal separation, high linearity, and low intermodulation. In particular, RF MEMS switches display good characteristics in a high RF range, for example, in an RF range of more than several GHz.

To reduce the costs of manufacturing RF MEMS devices, complementary metal oxide semiconductor (CMOS) manufacturing and packaging technology can be used. This allows for a CMOS circuit and an RF MEMS device to be easily integrated on a single chip. Most RF MEMS switches use surface micromachining and bulk micromachining at a low temperature.

However, conventional RF switches only have one or two output signals for each input signal. In addition, if an input voltage is removed, the RF switches return to their original states and the signal lines are disconnected.

In order to implement a configuration where there are three output signals for each input signal using conventional RF switches, two dual-output signal RF switches must be connected. However, this configuration increases the complexity of the device.

Accordingly, a new RF switch that has three output signals for each input signal is required.

In addition, an RF switch having a latching system in which an output signal is maintained is required so that the output signal is stable even when the input voltage is removed.

SUMMARY OF THE INVENTION

A non-limiting embodiment of the present invention provides a tri-state radio frequency (RF) switch having three output signals.

A non-limiting embodiment of the present invention also provides a tri-state RF switch in which an output signal is latched.

According to an aspect of the present invention, a tri-state RF switch includes: a first well formed in a first substrate; a first input signal line and a first output signal line forming a first gap therebetween in the first well; RF grounds isolated from the signal lines in the first well; a first driving electrode formed in the first well; a second substrate having second and third wells, the second substrate disposed such that the second and third wells face the first well; a post bar forming a boundary between the second well and third well in the second substrate; a second input signal line and a second output signal line, and a third input signal line and a third output signal line forming a second gap and a third gap in the second well and the third well, respectively; RF grounds isolated from the signal lines in the second well and the third well; a second driving electrode and a third driving electrode formed in the second well and the third well, respectively; and a membrane disposed between the first substrate and the second substrate such that the membrane crosses the first, second and third gaps, the membrane including a first conductive pad, a second conductive pad, and a third conductive pad thereon to face the first, second, and third gaps, respectively. The conductive pads may be, for example, metallic.

The membrane may be formed with a predetermined compressive stress.

The membrane may be latched in any one of tri-states, the tri-states including: a first state in which the first conductive pad contacts the signal lines forming the first gap; a second state in which the second conductive pad contacts the signal lines forming the second gap; and a third state in which the third conductive pad contacts the signal lines forming the third gap.

The membrane may include a conductive layer and dielectric layers formed above and below the conductive layer. The conductive layer may be metallic.

The first through third input signal lines may include a common RF signal line.

When the second conductive pad or the third conductive pad of the membrane contacts the second gap or the third gap, the membrane may be formed into a wave shape by the post bar.

The height of the post bar may be substantially the same as the height of the second well.

BRIEF DESCRIPTION OF THE DRAWINGS

The above and other aspects of the present invention will become more apparent by describing, in detail, exemplary embodiments thereof with reference to the attached drawings, in which.

DETAILED DESCRIPTION OF A NON-LIMITING EMBODIMENT OF THE INVENTION

Figure 1:
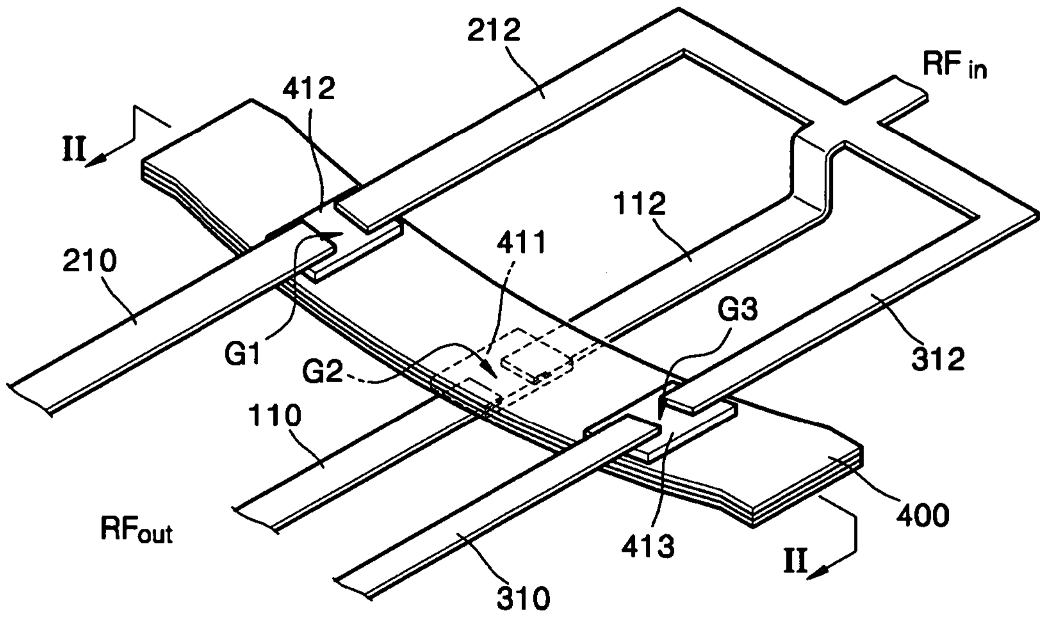
FIG. 1 is a schematic perspective view illustrating a structure of an RF switch according to an embodiment of the present invention.

FIG. 1 is a schematic perspective view illustrating a structure of an RF switch according to an embodiment of the present invention. Referring to FIG. 1, an input signal line of an RF switch is divided into first through third input signal lines 112, 212, and 312, and first through third gaps G1, G2, and G3 are formed between the input signal lines 112, 212, and 312 and three output signal lines 110, 210, and 310. The first output signal line 110 and the second and third output signal lines 210 and 310 are located at different heights.

A membrane 400 that crosses the first through third gaps G1, G2, and G3 is formed between the first output signal line 110 and the two output signal lines 210 and 310. First through third conductive pads 411, 412, and 413 that correspond to first through third gaps G1, G2, and G3, respectively, are formed on the membrane 400, and the conductive pads 411, 412, and 413 can transfer electricity between corresponding input signal lines and output signal lines. The conductive pads 411, 412, and 413 may be metallic. The membrane 400 is described later.

Figure 2:
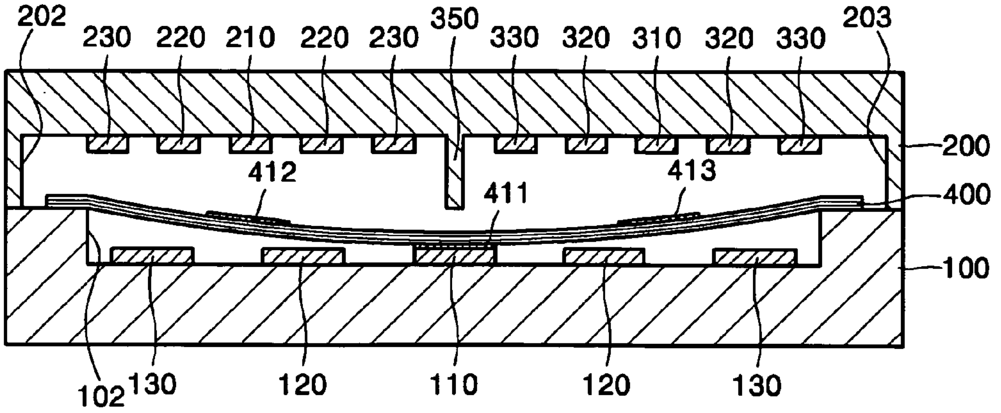
FIG. 2 is a cross-sectional view taken along line II-III of FIG. 1 illustrating a first state of the RF switch of FIG. 1.

FIG. 2 is a cross-sectional view taken along line II-III of FIG. 1, and illustrates substrates, post bars, RF grounds, and driving electrodes that cannot be easily illustrated in FIG. 1.

Referring to FIGS. 1 and 2, a first well 102 is formed in a lower substrate 100, and a first output signal line 110 is formed on the bottom of the first well 102. RF grounds 120 are formed on both sides of the first output signal line 110. In addition, first driving electrodes 130 are formed outside the RF grounds 120.

An upper substrate 200 in which a second well 202 and a third well 203 are formed is disposed on the lower substrate 100. A post bar 350 is formed at a boundary between the second well 202 and the third well 203. The second output signal line 210, RF grounds 220, and second driving electrodes 230 are formed on the bottom of the second well 202. Similarly, the third output signal line 310, RF grounds 320, and third driving electrodes 330 are formed on the bottom of the third well 203. The height of the post bar 350 may be substantially the same as the height of the second well 202.

The membrane 400 is installed between the lower substrate 100 and the upper substrate 200. As illustrated in FIG. 1, the membrane 400 crosses the three gaps G1, G2, and G3 between the input signal lines and the output signal lines. A compressive stress may be applied to the membrane 400. The compressive stress may bend the membrane 400 in a predetermined direction (e.g., a downward direction as illustrated in FIG. 2), and the membrane 400 may contact one of the gaps (e.g., the first gap G1) to connect an input line to an output line (e.g., the first input signal line 112 to the first output signal line 110, FIGS. 1 and 2). Therefore, in this state, even if voltages are not applied to the driving electrodes, the state of the RF switch is still maintained. That is, in the example illustrated in FIG. 2, the membrane 400 is latched in a first state. As described later, when the membrane 400 is changed to another state, the new state will also be latched.

Figure 3:
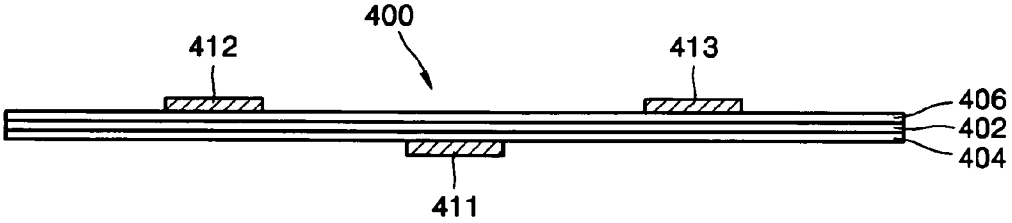
FIG. 3 is a cross-sectional view illustrating an example of a membrane of FIG. 2.

FIG. 3 is a cross-sectional view illustrating one example of the membrane 400 of FIG. 2. Referring to FIG. 3, the membrane 400 may include an intermediate conductive layer 402 and dielectric layers 404 and 406 formed below and above the intermediate conductive layer 402, respectively. The intermediate conductive layer 402 may be metallic. First through third conductive pads 411, 412, and 413 may be formed in positions that correspond to first through third gaps G1, G2, and G3, respectively. The conductive pads contact corresponding gaps and transfer electricity between corresponding input signal lines and output signal lines.

Although driving electrodes are disposed on the same plane as signal lines in the present embodiment, the present invention is not limited to this. The driving electrodes may be disposed below the signal lines.

The operation of an RF switch consistent with the present invention will now be described in detail.

First State

If a sacrificial layer is removed during a manufacturing process (described later), the membrane 400 to which a compressive stress is applied is bent in, for example, a downward direction. At this point, the first conductive pad 411 connects the first input signal line 112 and the first output signal line 110 to put the RF switch in the first state. Alternatively, if a predetermined pull-down voltage is applied to the first driving electrodes 130, the membrane 400 is bent by an electrostatic force between the membrane 400 and the first driving electrodes 130 towards the first driving electrodes 130 to put the RF switch in the first state from the second or third state (described later). Even if the pull-down voltage applied to the first driving electrodes 130 is removed, the membrane 400 maintains the first state. This latch function is based on the compressive stress of the membrane 400.

Second State

Figure 4:
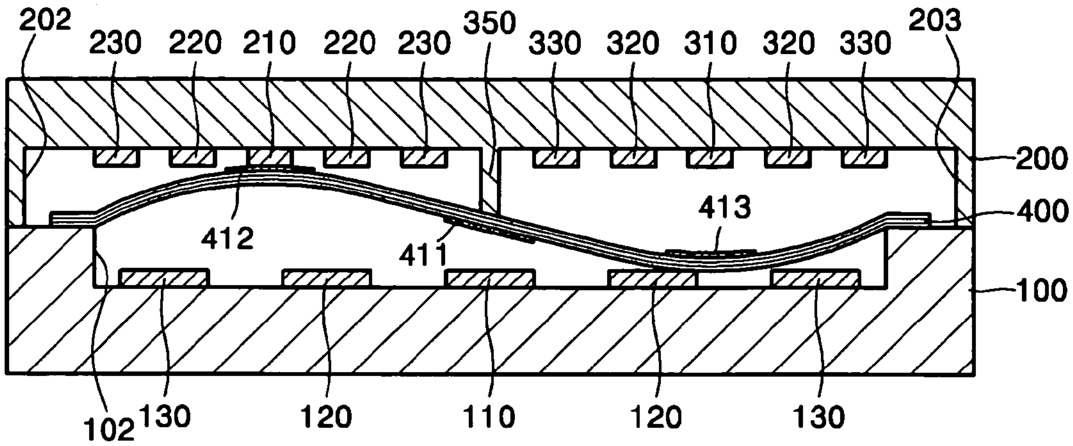
FIG. 4 is a cross-sectional view illustrating a second state of the RF switch of FIG. 1.

If a predetermined pull-down voltage is applied to the second driving electrodes 230 of the RF switch in the first state, the membrane 400 is bent by an electrostatic force between the second driving electrodes 230 and the membrane 400 towards the second driving electrodes 230, as illustrated in FIG. 4, to put the RF switch in the second state. In the second state, the second conductive pad 412 connects the second input signal line 212 and the second output signal line 210 to allow current to flow. The membrane 400 is formed into a wave shape by the post bar 350. Even if the pull-down voltage is removed, the RF switch in the second state maintains the second state.

Third State

Figure 5:
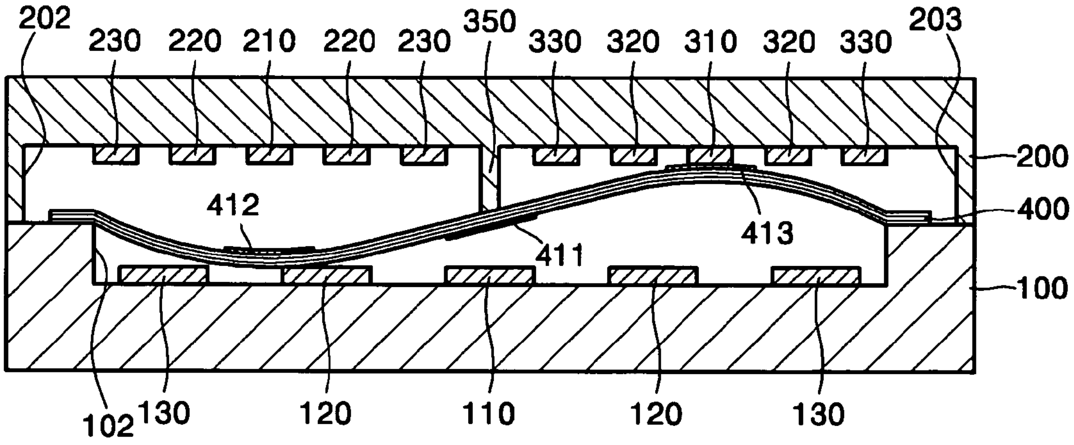
FIG. 5 is a cross-sectional view illustrating a third state of the RF switch of FIG. 1.

If a predetermined pull-down voltage is applied to the third driving electrodes 330 of the RF switch that is in the first state or the second state, the membrane 400 is bent by an electrostatic force between the third driving electrodes 330 and the membrane 400 towards the third driving electrodes 330, as illustrated in FIG. 5, to put the RF switch in the third state. In the third state, the third conductive pad 413 connects the third input signal line 312 and the third output signal line 310 to allow current to flow. Since the RF switch in the third state also has a latch function, the RF switch maintains the third state even when the pull-down voltage is removed,.

Figure 6:
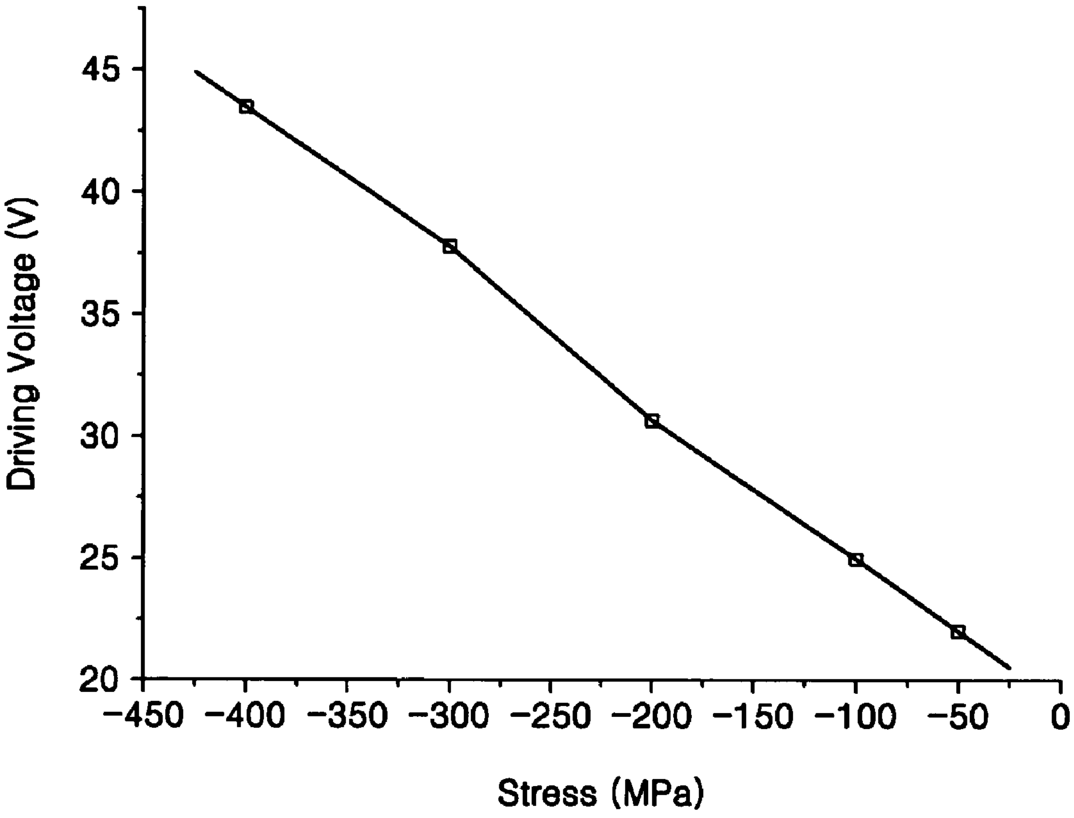
FIG. 6 is a graph illustrating a result obtained by plotting a relation between a driving voltage of an RF switch of FIG. 1 and an initial stress in a membrane of the RF switch.

FIG. 6 is a graph illustrating the result obtained by plotting a relation between a driving voltage (pull-down voltage) of an RF switch and an initial stress in a membrane of the RF switch according to the present invention. Referring to FIG. 6, for a membrane 400 that has a length of 600 μm, a thickness of 1 μm and a Young's modulus of 200 GPa, and for a gap between a driving electrode and the membrane 400 that is 3-4 μm, the driving voltage to move the member 400 will increase as the initial compressive stress increases. In order to reduce the driving voltage, a reduction in the initial compressive stress is required. This may be accomplished by increasing the length of the membrane 400, reducing the thickness of the membrane 400, and/or lowering the spring constant of the membrane 400.

FIGS. 7A through 7H are cross-sectional views explaining a method of manufacturing a tri-state RF switch that is consistent with the present invention. The elements of the present embodiment use the same reference numerals as those of the previous embodiments, and a detailed description thereof will be omitted.

Manufacture of Lower Structure

Figure 7A:
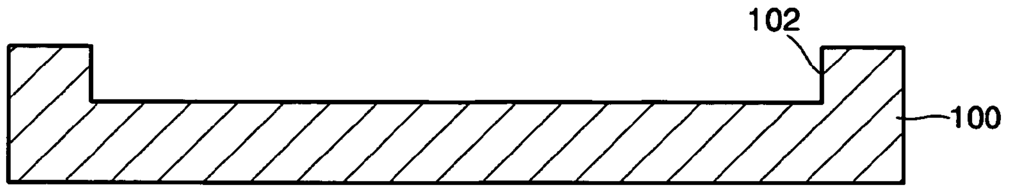
FIGS. 7A through 7H are cross-sectional views explaining a method of manufacturing a tri-state RF switch according to an embodiment consistent with the present invention.

Referring to FIG. 7A, a first well 102 having a depth of about 2 μm is formed by etching a lower substrate 100. The lower substrate 100 can be formed of silicon, gallium arsenide (GaAs), quartz, glass, etc.

Figure 7B:
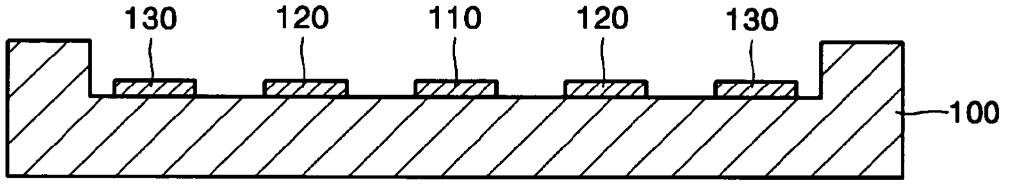

Referring to FIG. 7B, an aluminum or chromium/gold metal is deposited on the first well 102 and then patterned so that a first input signal line 112 (refer to FIG. 1) and a first output signal line 110, RF grounds 120, and first driving electrodes 130 are formed.

Figure 7C:
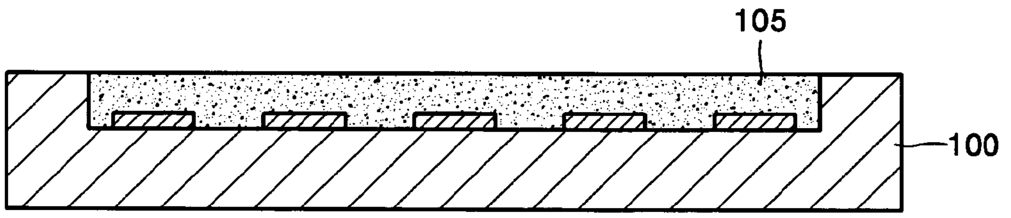

Referring to FIG. 7C, a sacrificial layer 105 is spin coated on the lower substrate 100 to fill the first well 102 and then is etched and planarized. The sacrificial layer 105 may be a photoresist, polyimide or silicon oxide.

Figure 7D:
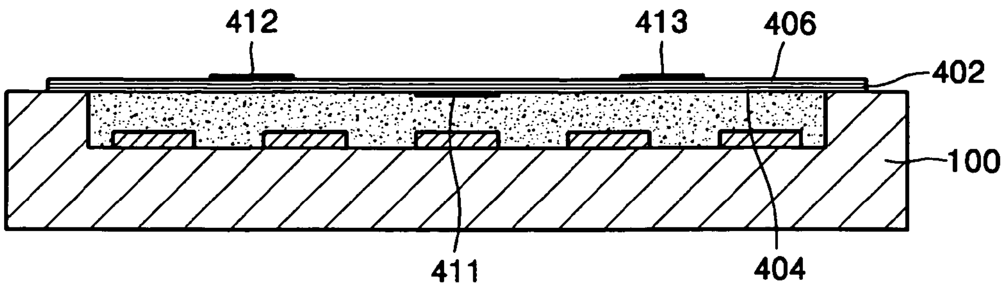

Referring to FIG. 7D, a conductive material is formed on the sacrificial layer 105 and then patterned so that the first conductive pad 411 is formed on the sacrificial layer 105. Subsequently, a first dielectric layer 404, a conductive layer 402, and a second dielectric layer 406 are sequentially stacked on the sacrificial layer 105 and the lower substrate 100. Subsequently, the stack structure is patterned so that a membrane 400 having a predetermined width is formed. Subsequently, the second conductive pad 412 and the third conductive pad 413 are formed on the membrane 400.

The first and second dielectric layers 404 and 406 may be formed of silicon oxide or silicon nitride, and the conductive layer 402 may be formed, for example, of aluminum or gold. In addition, the first through third conductive pads 411, 412, and 413 may be formed, for example, of aluminum.

A predetermined compressive stress is applied to a material used to deposit the membrane 400. The compressive stress depends on deposition conditions, for example, the deposition temperature, the deposition rate, and the source gas used in the process. In addition, the compressive stress partially depends on the materials used to form the membrane 400. Due to the compressive stress applied to the membrane 400, the membrane 400 is bent to one side.

Figure 7E:
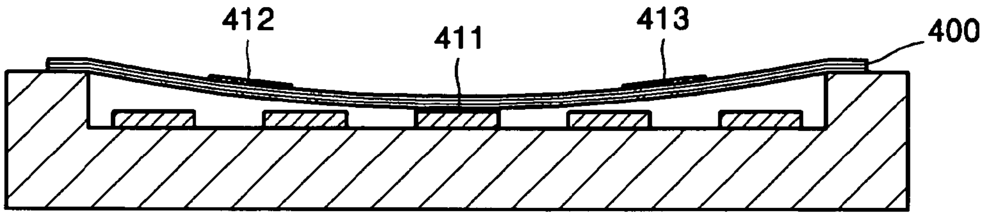

Referring to FIG. 7E, if the sacrificial layer 105 is removed using wet etching or plasma ashing, the membrane 400 is bent in a downward direction and maintains a first state. In this case, the first conductive pad 411 of the membrane 400 is positioned on the first gap G1 (refer to FIG. 1) between the first input signal line 112 and the first output signal line 110.

Manufacture of Upper Structure

Figure 7F:
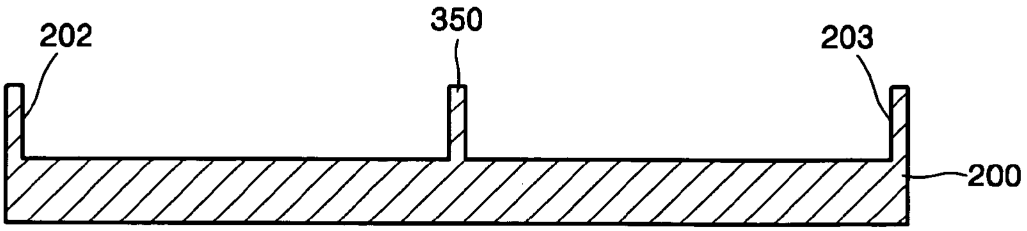

Referring to FIG. 7F, a second well 202 and a third well 203 each having a depth of about 2 μm are formed by etching an upper substrate 200. A post bar 350 is formed at a boundary between the second well 202 and the third well 203. The upper substrate 200 can be formed of silicon, GaAs, quartz, glass, etc.

The post bar 350 may be an island type, and the second well 202 and the third well 203 may be formed as one well.

Figure 7G:
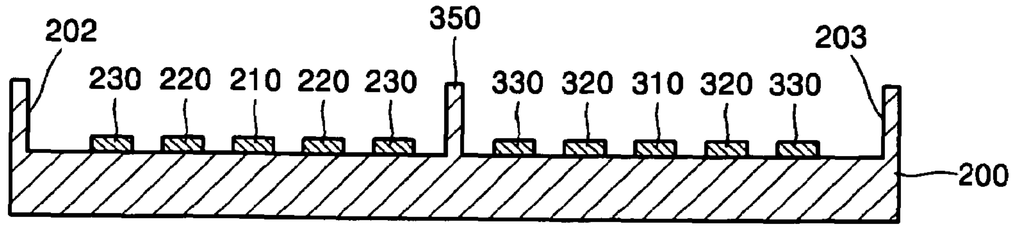

Referring to FIG. 7G, an aluminum or chromium/gold metal is deposited on the second and third wells 202 and 203 and then patterned so that second and third input signal lines 212 and 312, second and third output signal lines 210 and 310, RF grounds 220 and 320, and second and third driving electrodes 230 and 330 are formed.

Bonding of Upper Structure and Lower Structure

Figure 7H:
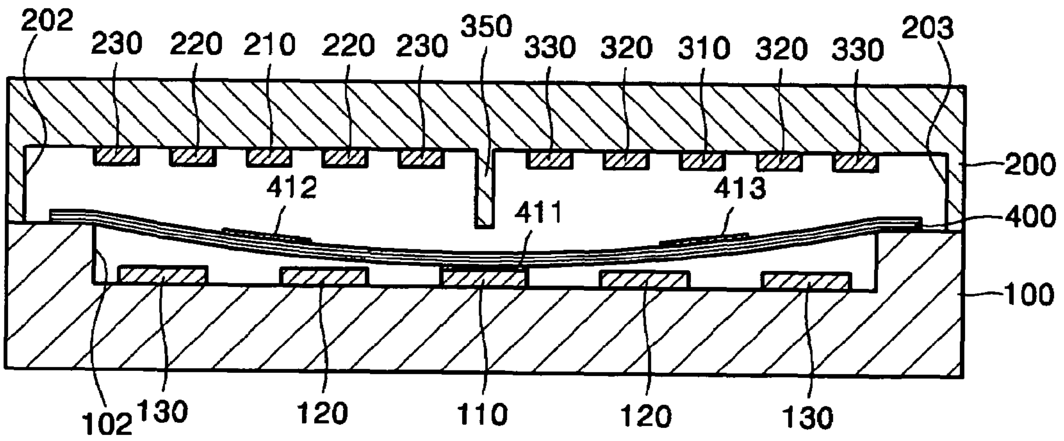

Referring to FIG. 7H, the lower substrate 100 and the upper substrate 200 are joined to each other so that a tri-state RF switch is produced.

As described above, in the tri-state RF switch according to the present invention, three output signal lines are provided for a single input signal line. Therefore, the structure of the tri-state RF switch is simple when compared with the conventional RF switch configuration. In addition, since the tri-state RF switch has a latch function, the latched state is maintained even when the applied voltage is removed.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A tri-state RF switch comprising:
- a first well formed in a first substrate;
- a first input signal line and a first output signal line forming a first gap therebetween in the first well;
- a first driving electrode formed in the first well;
- a second substrate having a second well and a third well, the second substrate disposed such that the second well and the third well face the first well;
- a post bar forming a boundary between the second well and third well in the second substrate;
- a second input signal line and a second output signal line forming a second gap therebetween in the second well;
- a third input signal line and a third output signal line forming a third gap therebetween in the third well;
- a second driving electrode and a third driving electrode formed in the second well and the third well, respectively; and
- a membrane disposed between the first substrate and the second substrate such that the membrane crosses the first gap, the second gap and the third gap, the membrane comprising a first conductive pad that faces the first gap, a second conductive pad that faces the second gap, and a third conductive pad that faces the third gap.

2. The tri-state RF switch of claim 1, wherein the membrane is formed with a predetermined compressive stress.

3. The tri-state RF switch of claim 1, wherein the membrane is latched in any one of tri-states, the tri-states comprising:
- a first state in which the first conductive pad contacts the first input signal line and the first output signal line forming the first gap;
- a second state in which the second conductive pad contacts the second input signal line and the second output signal line forming the second gap; and
- a third state in which the third conductive pad contacts the third input signal line and the third output signal line forming the third gap.

4. The tri-state RF switch of claim 1, wherein the membrane includes a conductive layer and dielectric layers formed above and below the conductive layer.

5. The tri-state RF switch of claim 1, wherein the first input signal line, the second input signal line and the third input signal line comprise a common RF signal line.

6. The tri-state RF switch of claim 1, wherein, when the second conductive pad or the third conductive pad of the membrane contacts the second gap or the third gap, the membrane is formed into a wave shape by the post bar.

7. The tri-state RF switch of claim 1, wherein a height of the post bar is substantially the same as a height of the second well.

8. The tri-state switch of claim 1, wherein the first conductive pad, the second conductive pad and the third conductive pad are metallic.

9. The tri-state switch of claim 1, wherein the first well, the second well and the third well each comprise RF grounds isolated from signal lines in the respective wells.

10. The tri-state switch of claim 4, wherein the conductive layer is metallic.

11. The tri-state switch of claim 1, wherein the first substrate and the second substrate are made of silicon, gallium arsenide or glass.

12. The tri-state switch of claim 8, wherein the first conductive pad, the second conductive pad and the third conductive pad are made of aluminum.

13. The tri-state switch of claim 10, wherein the conductive layer is made of aluminum or gold.

14. The tri-state switch of claim 4, wherein the dielectric layers are made of silicon oxide or silicon nitride.

* * * * *